United States Patent
Yamabayashi et al.

(10) Patent No.: US 10,379,202 B2
(45) Date of Patent: Aug. 13, 2019

(54) RADAR APPARATUS AND METHOD OF CONTROLLING TRANSMISSION SIGNAL

(71) Applicant: FURUNO ELECTRIC CO., LTD., Nishinomiya (JP)

(72) Inventors: Jun Yamabayashi, Kobe (JP); Koji Dai, Nishinomiya (JP); Tatsuya Kojima, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 305 days.

(21) Appl. No.: 15/317,625

(22) PCT Filed: May 19, 2015

(86) PCT No.: PCT/JP2015/064261
§ 371 (c)(1),
(2) Date: Dec. 9, 2016

(87) PCT Pub. No.: WO2015/190232
PCT Pub. Date: Dec. 17, 2015

(65) Prior Publication Data
US 2017/0123050 A1     May 4, 2017

(30) Foreign Application Priority Data

Jun. 11, 2014   (JP) ................. 2014-120158

(51) Int. Cl.
*G01S 7/12*        (2006.01)
*G01S 7/282*       (2006.01)
(Continued)

(52) U.S. Cl.
CPC ............. *G01S 7/282* (2013.01); *G01S 7/12* (2013.01); *G01S 7/22* (2013.01); *G01S 13/42* (2013.01);
(Continued)

(58) Field of Classification Search
CPC . G01S 7/12; G01S 7/282; G01S 13/72; G01S 13/89; G01S 13/9307; G01S 7/22; G01S 13/42; G01S 13/93
(Continued)

(56) References Cited

U.S. PATENT DOCUMENTS 4,281,326 A * 7/1981 Anderson ............... G08G 3/02
                                                         342/177
4,649,390 A   3/1987 Andrews et al.
(Continued)

FOREIGN PATENT DOCUMENTS

CN      101162267 A    4/2008
CN      101802644 A    8/2010
(Continued)

OTHER PUBLICATIONS

International Search Report dated Aug. 18, 2015 in corresponding PCT Application No. PCT/JP2015/064261, 4 pgs.
(Continued)

*Primary Examiner* — Timothy X Pham
(74) *Attorney, Agent, or Firm* — Knobbe, Martens, Olson & Bear LLP

(57) ABSTRACT

Provided is a radar apparatus capable of suitably transmitting a transmission signal according to a target object existing around the radar apparatus, and suitably displaying one of the target object therearound, a response signal of a radar beacon etc. The radar apparatus includes a determiner configured to determine one of a target object and an area, an angular range setter configured to set an angular range centering on the position of the radar apparatus to include the one of the target object and the area determined by the determiner, and a transmission signal controller configured to change a waveform of the transmission signal to be
(Continued)

different between a direction within the angular range and a direction outside the angular range.

15 Claims, 11 Drawing Sheets

(51) Int. Cl.
    *G01S 7/22*     (2006.01)
    *G01S 13/72*     (2006.01)
    *G01S 13/89*     (2006.01)
    *G01S 13/42*     (2006.01)
    *G01S 13/93*     (2006.01)

(52) U.S. Cl.
    CPC .............. *G01S 13/72* (2013.01); *G01S 13/89* (2013.01); *G01S 13/9307* (2013.01)

(58) Field of Classification Search
    USPC .......................................................... 342/85
    See application file for complete search history.

(56) References Cited

U.S. PATENT DOCUMENTS

| | | | |
|---|---|---|---|
| 7,663,537 B2 | 2/2010 | Suzuki et al. | |
| 8,390,506 B2 | 3/2013 | Focke et al. | |
| 9,354,809 B2 | 5/2016 | Asahara et al. | |
| 2005/0194553 A1* | 9/2005 | Tsuji | G01S 7/282 250/559.4 |
| 2008/0088497 A1* | 4/2008 | Nakanishi | G01S 3/20 342/73 |
| 2009/0009383 A1* | 1/2009 | Nakanishi | G01S 3/20 342/118 |
| 2009/0303107 A1* | 12/2009 | Ando | G01S 3/74 342/146 |
| 2012/0139773 A1 | 6/2012 | Misonoo et al. | |
| 2014/0203916 A1* | 7/2014 | Sano | G06K 7/10089 340/10.6 |
| 2015/0035772 A1 | 2/2015 | Asahara et al. | |
| 2015/0177375 A1* | 6/2015 | Nakabayashi | G01S 13/345 342/70 |

FOREIGN PATENT DOCUMENTS

| | | |
|---|---|---|
| CN | 103842244 A | 6/2014 |
| JP | S60-501974 | 11/1985 |
| JP | S62-226076 | 10/1987 |
| JP | 2000-284045 | 10/2000 |
| JP | 2000-292519 | 10/2000 |
| JP | 2012-118016 | 6/2012 |
| JP | 2013-057584 | 3/2013 |
| JP | 2013-178206 | 9/2013 |
| JP | 2013-238532 | 11/2013 |
| WO | WO 2013/051047 | 4/2013 |

OTHER PUBLICATIONS

Butler, Joseph, Tracking and Control in Multi-Function Radar, Aug. 1998.
European Search Report dated Jan. 25, 2018 in corresponding PCT Application No. PCT/JP2015064261, 11 pgs.
Smits, Adriaan et al., Overview of the APAR Multifunction Radar, European Radar Conference 2004, pp. 13-16.

* cited by examiner

STORED CONTENTS OF SWITCH INFO MEMORY

| ANGULAR RANGE | SWITCHING CONTENT |
|---|---|
| A1°~A2° | TRANSMISSION POWER: HIGH |
| B1°~B2° | PULSE WIDTH: SHORT |
| C1°~C2° | ANGLE MODULATION: PERFORMED |
| D1°~D2° | COMMUNICATION WAVE |

RADAR APPARATUS AND METHOD OF CONTROLLING TRANSMISSION SIGNAL

TECHNICAL FIELD

This disclosure generally relates to a radar apparatus which detects a target object by transmitting transmission signals therearound.

BACKGROUND

Conventionally, radar apparatuses are known, which include an antenna for rotating on a horizontal plane and detect a target object around the radar apparatus by transmitting and receiving radio waves while rotating the antenna. The radar apparatus is capable of changing a pulse width of the transmission signal according to an instruction from a user etc. Further a pulse compression radar is capable of changing equivalent transmission power by changing a pulse width of a transmission signal. This type of radar apparatus is installed in a movable body (e.g., ship), a lighthouse, etc.

Further, depending on the installation circumstance of the radar apparatus etc., the transmission signal may be set to be transmitted only to a given angular range. This setting is used not to transmit rearward the transmission signal in a case where an obstacle (e.g., part of a ship) constantly exists rearward of the radar apparatus, etc.

Moreover, in Patent Document 1, an art of increasing the number of transmissions of a transmission signal per unit time for a given angular range is disclosed. Thus, it is possible to improve the resolution only for a required part while preventing an increase in data amount.

REFERENCE DOCUMENT OF CONVENTIONAL ART

Patent Document

Patent Document 1: JP2012-112674A

DESCRIPTION OF THE DISCLOSURE

Problems to be Solved by the Disclosure

Incidentally, when a weak echo is displayed in a radar image generated and displayed by a radar apparatus, a user would try to observe the weak echo by increasing the reception gain.

However, even if the reception gain is increased, the transmission power does not change and thus the power of a reflection wave from a target object also does not change. Therefore, even if the reception gain is increased, a noise power ratio with respect to a reflection power ratio from the target object remains the same. In other words, if the reception gain is increased, although the target object is displayed clearly, the noise increases as well, thus the viewability of the image degrades.

Further, for example with a pulse compression radar, since a pulse width of a transmission signal is long, there is a case where a response from a radar beacon cannot be obtained. Here, if the pulse width of the transmission signal is shortened in the pulse compression radar, detection accuracy of the target object significantly degrades.

Note that in Patent Document 1, although the number of transmissions of the transmission signal is increased, this is simply to transmit the same kind of transmission signals, and therefore, the subject described above cannot be solved.

This disclosure is made in view of the above situations and generally aims to provide a radar apparatus which is capable of suitably transmitting a transmission signal according to a target object existing around the radar apparatus, and suitably displaying one of the target object therearound, a response signal of a radar beacon etc.

SUMMARY

The problems to be solved by the present disclosure is described as above, and measures to solve the problems and effects thereof will be described as follow.

According to a first aspect of this disclosure, a radar apparatus for detecting a target object around the radar apparatus by transmitting a transmission signal while changing a transmitting direction centering on a position of the radar apparatus is provided with the following configuration. That is, the radar apparatus includes a determiner configured to determine one of a target object and an area, an angular range setter configured to set an angular range centering on the position of the radar apparatus to include the one of the target object and the area determined by the determiner, and a transmission signal controller configured to change a waveform of the transmission signal to be different between a direction within the angular range and a direction outside the angular range.

Thus, it is possible to suitably transmit the transmission signal according to the target object existing around the radar apparatus. Therefore, it is possible to suitably display one of the target object therearound, a response signal of a radar beacon etc.

With the radar apparatus described above, the transmission signal controller may change a transmission power of the transmission signal to be different between the direction within the angular range and the direction outside the angular range.

Thus, by increasing the transmission power (including equivalent transmission power), for example, while emphasizing a weak echo, it is possible to prevent that other echoes and noise are emphasized.

With the radar apparatus described above, the transmission signal controller may change a pulse width of the transmission signal to be different between the direction within the angular range and the direction outside the angular range.

Thus, in a case where, for example, a pulse compression radar is used, by shortening the pulse width for the angular range including the radar beacon, it is possible to detect the target object as usual for the other bearings while causing the radar beacon to respond.

With the radar apparatus described above, the transmission signal controller may use the transmission signal transmitted in the direction within the angular range to be a communication wave.

Thus, while transmitting the communication wave which requests the radar beacon for given information, etc, it is possible to detect the target object as usual for the other bearings.

With the radar apparatus described above, the determiner may be a target object tracker configured to track the target object based on target object information previously acquired. The angular range setter may set the angular range to include the target object tracked by the target object tracker.

Thus, since the angular range is automatically set according to shifting of the weak echo etc., it is possible to reduce the burden on a user. Further, it is possible to prevent the weak echo from being lost.

With the radar apparatus described above, the transmission signal controller may change whether to include a modulated pulse signal in the transmission signal to be different between the direction within the angular range and the direction outside the angular range.

The modulated pulse signal may cause an influence, such as interference or interruption against other wireless equipment (a weather radar, a satellite broadcast receiver etc.). Therefore, by setting the range where the modulated pulse signal is not transmitted as described above, it is possible to prevent the influence on the wireless equipment within the angular range.

The radar apparatus described above may have the following configuration. That is, in the direction within the angular range, a non-modulated pulse signal is transmitted as the transmission signal. In the direction outside the angular range, the non-modulated pulse signal and the modulated pulse signal are transmitted as the transmission signal.

Thus, it is possible to, while preventing the influence on the wireless equipment within a part of the angular range, accurately grasp the target objects in close distance and long distance within the other angular range.

With the radar apparatus described above, the determiner may determine a position of a wireless equipment, and the angular range setter may set the angular range based on the position of the wireless equipment determined by the determiner.

Thus, since the angular range is automatically set based on the position of the wireless equipment etc., it is possible to reduce the burden on the user to set the angular range.

The radar apparatus described above may have the following configuration. That is, the determiner determines a position of a land. The angular range setter sets the angular range to include a direction in which the land is located.

Thus, since the wireless equipment is normally installed on the land, by determining the position of the land and not transmitting the modulated pulse signal in the direction of the land, it is possible to prevent the influence on the wireless equipment.

With the radar apparatus described above, the determiner may determine the position of the land based on a reception signal received as a reflection wave caused by the transmission signal.

Thus, it is possible to determine the position of the land also in an area of which a nautical chart is not stored.

With the radar apparatus described above, the determiner may determine the position of the land based on one of a nautical chart and a geographical chart.

Thus, comparing with the case using the reception signal, it is possible to determine the land reliably and accurately.

The radar apparatus described above may have the following configuration. That is, the radar apparatus includes a display unit configured to display a radar image. The determiner is a detector configured to detect an angle specifying operation that is a touch performed on the display unit and an operation of specifying the angular range. The angular range setter sets the angular range according to the angle specifying operation detected by the detector.

Thus, the user can perform the angle specifying operation while looking at the radar image, and therefore, it is possible to intuitively and easily specify as the angular range a range including the observed target object etc. Further, the user can specify the angular range without taking his/her eyes off the radar image, and therefore, the observed target object etc. is prevented from being lost.

With the radar apparatus described above, the angle specifying operation may be an operation of moving the touched position while the display unit is touched.

Thus, the user can perform the angle specifying operation easily and quickly.

The radar apparatus described above may include a radar image generator configured to generate a radar image and perform display processing for the direction within the angular range and display processing for the direction outside the angular range in different manners.

Thus, the user can intuitively and easily check whether the set angular range corresponds to a bearing of his/her intention. Especially in a case where the radar apparatus itself or the other target object move, it is possible to intuitively and easily check whether the angular range is suitable.

The radar apparatus described above may have the following configuration. That is, the radar apparatus includes an antenna configured to transmit the transmission signal while rotating, and an angle detector configured to detect a rotational angle of the antenna. When the rotational angle of the antenna detected by the angle detector is within the angular range, the transmission signal controller transmits the transmission signal having a waveform different from that in the direction outside the angular range.

Thus, since the angle detector is conventionally provided in many cases, it is possible to exert the effects of this application without adding any special device.

According to a second aspect of the disclosure, a method of controlling a transmission signal, used by a radar apparatus for detecting a target object around the radar apparatus by transmitting a transmission signal while changing a transmitting direction centering on a position of the radar apparatus, is provided with the following process. That is, the method includes determining one of a target object and an area, setting an angular range centering on the position of the radar apparatus to include the one of the target object and the area determined by the determining, and changing a waveform of the transmission signal to be different between a direction within the angular range and a direction outside the angular range.

Thus, it is possible to suitably transmit the transmission signal according to the target object existing around the radar apparatus. Therefore, it is possible to suitably display one of the target object therearound, a response signal of a radar beacon etc.

BRIEF DESCRIPTION OF DRAWINGS

FIG. 4 is a table illustrating stored contents in a switch information memory.

MODES FOR CARRYING OUT THE DISCLOSURE

Next an embodiment of this disclosure is described with reference to the drawings. First, a radar apparatus 1 is described with reference to FIG. 1 which is a block diagram illustrating a structure of the radar apparatus 1 according to the embodiment of this disclosure.

Figure 1:
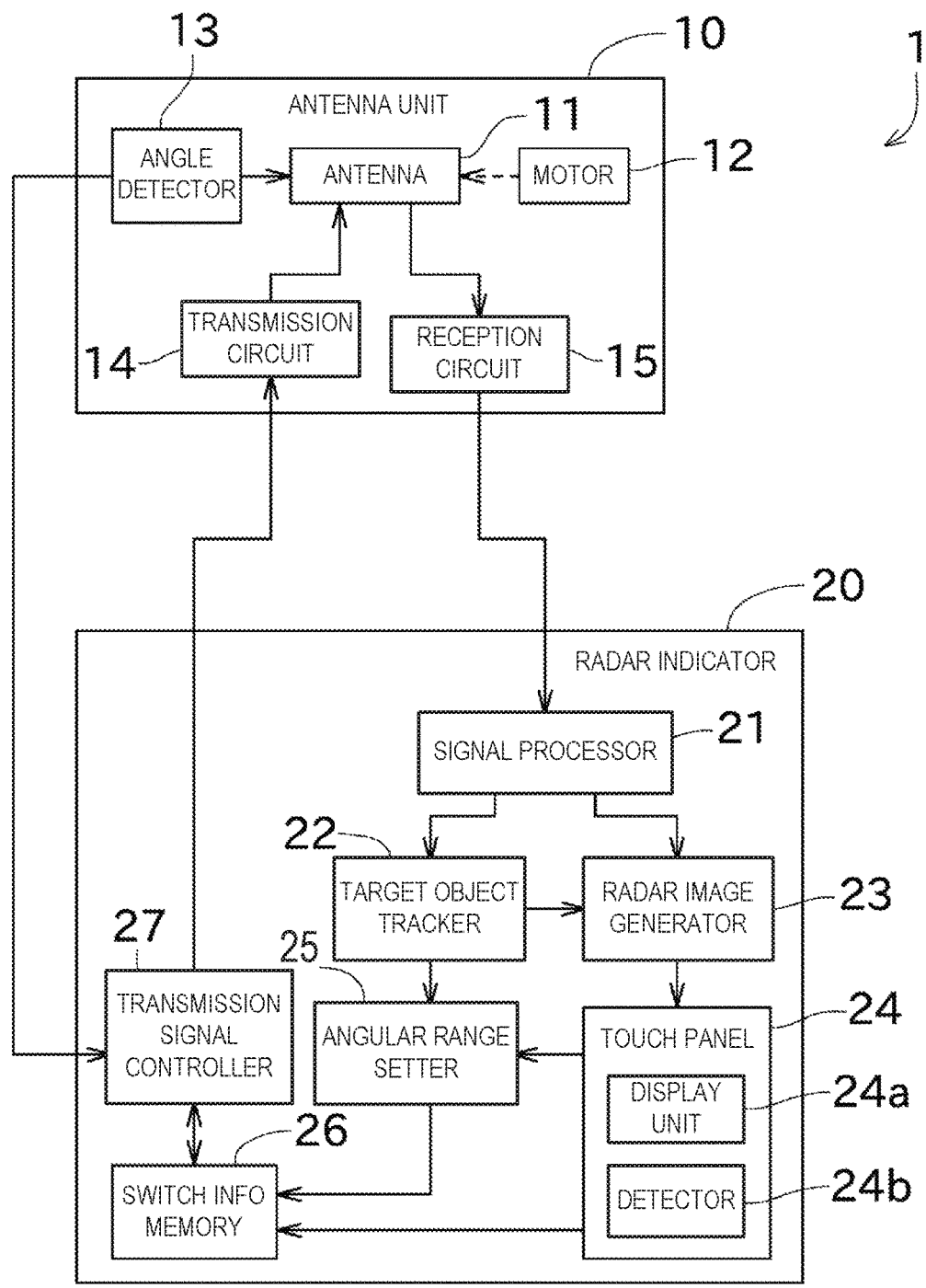
FIG. 1 is a block diagram illustrating a structure of a radar apparatus according to one embodiment of this disclosure.

The radar apparatus 1 is a type of radar apparatus which is installed in a ship (first ship), transmits a radio wave with long pulse width (transmission signal), receives a reception signal caused thereby, and analyzes the reception signal by applying a pulse compression thereon. Thus, the radar apparatus 1 is capable of detecting a position of a target object. As illustrated in FIG. 1, the radar apparatus 1 includes an antenna unit 10 and a radar indicator 20.

The antenna unit 10 includes an antenna 11, a motor 12, an angle detector 13, a transmission circuit 14, and a reception circuit 15. Note that the transmission and reception circuits 14 and 15 may be provided to the radar indicator 20 or they may be disposed separately from the antenna unit 10 and the radar indicator 20, respectively.

The antenna 11 is comprised of a rotational shaft and an antenna body. The rotational shaft is a cylindrical member configured to be rotatable. A waveguide through which the transmission signal generated by the transmission circuit 14 passes is formed inside the rotational shaft. The antenna body is attached to an upper part of the rotational shaft and transmits outside the transmission signal through the waveguide of the rotational shaft. Further the antenna body receives a reflection wave caused by the transmission signal reflected on the target object. The reflection wave thus obtained is transmitted to the reception circuit 15.

The motor 12 is connected with the rotational shaft of the antenna 11 through a given transmission mechanism. The motor 12 generates a drive force in response to an instruction from the radar indicator 20, and continuously rotates the antenna 11.

The angle detector 13 is attached to the rotational shaft of the antenna 11 and detects a rotational angle of the antenna 11. For example, the angle detector 13 generates a pulse signal every time the rotational shaft rotates by a given angle. The angle detector 13 is capable of detecting the rotated angle of the antenna 11 by counting the number of pulses. The detection result of the angle detector 13 is outputted to the radar indicator 20.

The transmission circuit 14 generates the transmission signal in response to an instruction from the radar indicator 20, and outputs it to the antenna 11. The transmission circuit 14 is capable of generating various transmission signals with different transmission power, pulse width, type of radio emission, etc. Here, changing the transmission power includes changing equivalent transmission power by changing the pulse width. Further the transmission circuit 14 is capable of generating a transmission signal for communication (communication wave) in addition to the transmission signal for detection.

The reception circuit 15 amplifies, filters, AD converts etc. the reflection wave received by the antenna 11. The reception circuit 15 outputs the converted reflection wave to the radar indicator 20.

The radar indicator 20 includes a signal processor 21, a target object tracker (determiner) 22, a radar image generator 23, and a touch panel 24, as a basic structure of the radar apparatus.

The signal processor 21 performs a pulse compression, a gain adjustment, removal processing of, for example, a water surface reflection, a scan correlation, etc. on the reflection wave received from the reception circuit 15. Note that at least part of the processings performed by the signal processor 21 may be conducted on the antenna unit 10 side, and/or at least part of the processings performed by the reception circuit 15 may be conducted on the signal processor 21 side. The signal processor 21 outputs the signal-processed reflection wave to the target object tracker 22 and the radar image generator 23.

The target object tracker 22 is configured to achieve a TT (Target Tracking) function. Although detailed explanation of the TT (or ARPA) function is omitted since it is known, it automatically detects and captures the position of the target object based on the reflection wave acquired by the antenna unit 10, and estimates a speed vector of the target object by tracking movement of the target object based on a shift of the reflection wave with time. This TT information calculated by the target object tracker 22 is outputted to the radar image generator 23.

Figure 2:
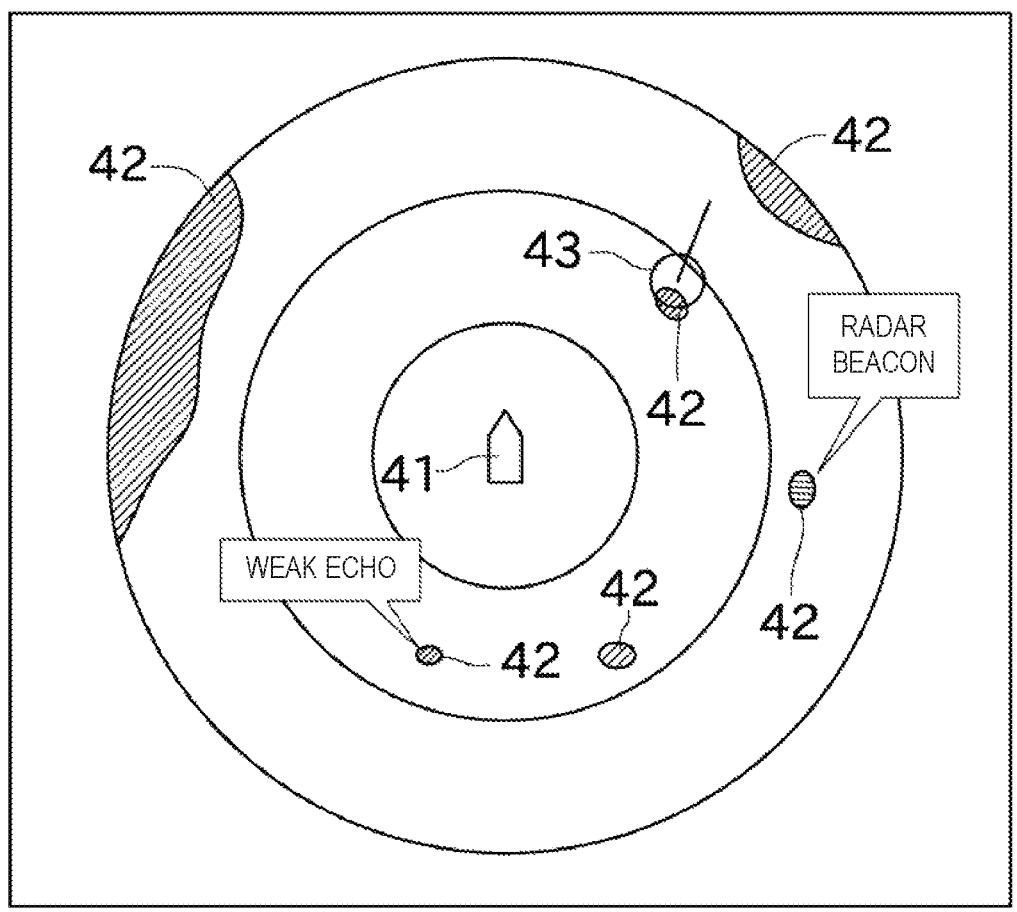
FIG. 2 is a view illustrating a radar image.

The radar image generator 23 is capable of generating a radar image by performing known signal processing based on a signal-processed radar echo. For example, the radar image generator 23 acquires a distance to the target object based on a time difference between a transmitted timing of the transmission signal by the antenna 11 and a received timing of the reflection wave. Further the radar image generator 23 acquires a direction in which the target object exists based on an orientation of the antenna 11 when the transmission signal is transmitted. Thus, the radar image generator 23 is capable of generating the radar image as illustrated in FIG. 2. Further the radar image generator 23 is capable of displaying, on the radar image, the TT information received from the target object tracker 22.

As illustrated in FIG. 2, on the radar image, a first ship mark 41, echoes 42, and a TT mark 43 are displayed.

The first ship mark 41 indicates a position of the first ship. Each echo 42 is a target object of which distance and bearing are calculated based on the reflection wave as described above. The large echo 42 indicates a land and the small echo 42 indicates a second ship, a channel buoy, a radar beacon, etc. The TT mark 43 is formed based on the TT information calculated by the target object tracker 22 described above. The TT mark 43 is comprised of a circular mark indicating the position of the second ship (target object) and a line segment (speed vector) indicating the speed of the second ship (target object).

The touch panel 24 is a device structured by integrating a display unit 24a with a detector (determiner) 24b. The display unit 24a is comprised of a liquid crystal display etc. The display unit 24a is capable of displaying the radar image described above. Further the display unit 24a is capable of receiving a touch from the user and the detector 24b is capable of detecting the touch. In this embodiment, a projected capacitance system is used as a method to detect the touch. In this method, a plurality of electrodes with high transmittance are arranged on the display panel, and the touched position is detected based on a change in capacitance of each electrode which occurs when a fingertip approaches near the panel.

Further the radar indicator 20 of this embodiment is capable of differentiating the waveform of the transmission signal transmitted in a direction within a given angular range centering on the first ship, from the waveform of the transmission signal transmitted in a direction outside the angular range. As a configuration to exert this function, the radar indicator 20 includes an angular range setter 25, a switch information memory 26, and a transmission signal controller 27.

The angular range setter 25 sets the angular range described above. The angular range setter 25 sets the angular range to include one of a specified target object and area by the user, based on an operation of the user detected by the touch panel 24, for example. Note that, the angular range setter 25 is also capable of setting the angular range based on, for example, information detected by other element which is the determiner, regardless of an instruction from the user (described later in detail).

To describe a specific flow, the user performs a given operation first to shift an operation mode of the radar indicator 20 to a mode of setting the angular range. Next, the user performs an angular specifying operation (area specifying operation). Note that the radar indicator 20 may constantly accept the angular specifying operation so that the shifting to the mode of setting the angular range becomes unnecessary.

Figure 3:
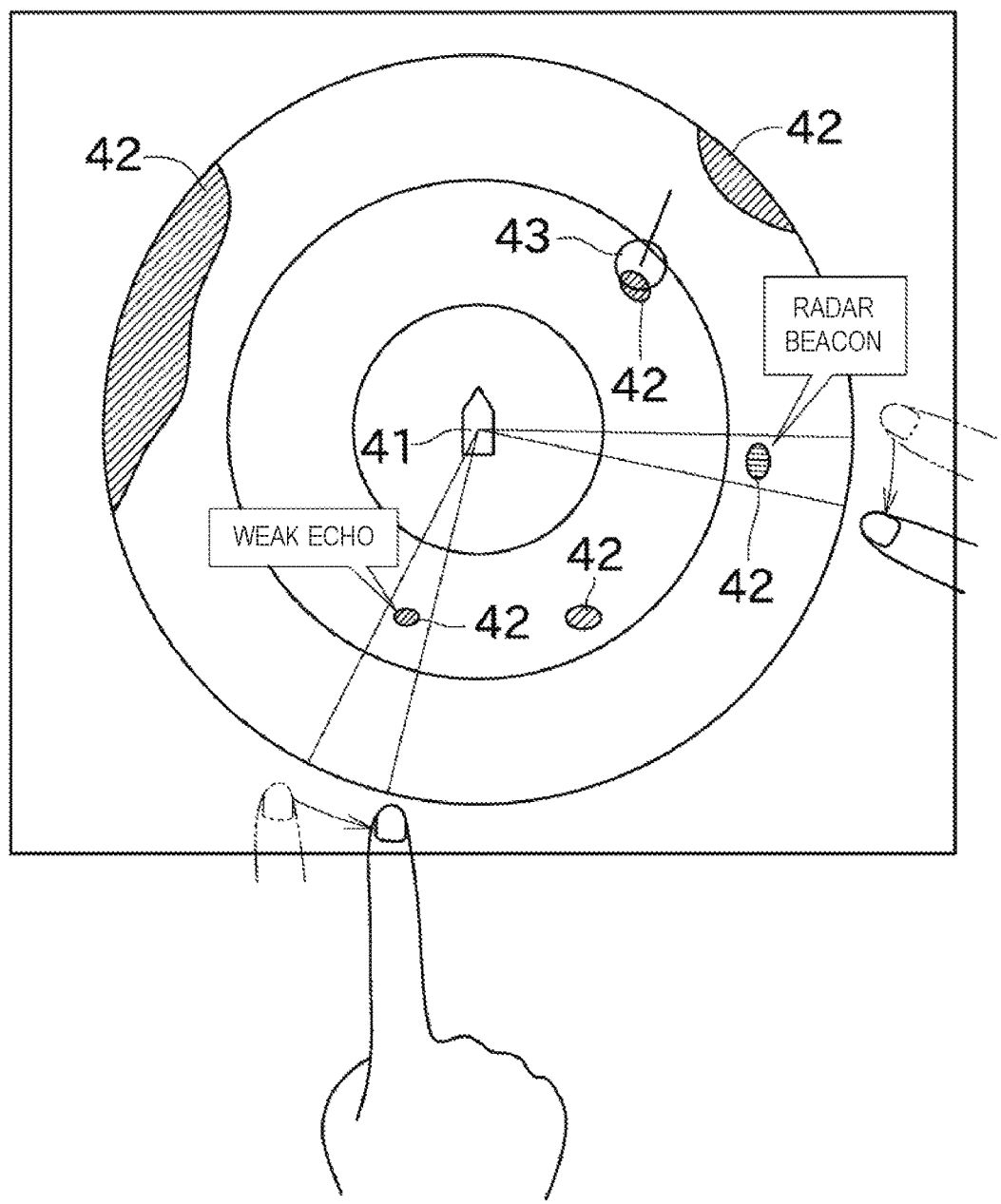
FIG. 3 is a view illustrating an angle specifying operation.

As illustrated in FIG. 3, the angular specifying operation is an operation of bringing a finger into contact with the radar image or a position therearound, and moving it in an arc shape while keeping the contact. Then, by removing the finger from a display screen, the angular specifying operation is fixed. In this embodiment, while the finger is in contact until it is removed, by displaying two line segments as illustrated in FIG. 3, a currently specified area is displayed. Thus, the user can easily set a desired area (angular range) by moving the finger. By touching as above, a given area is determined through the touch panel 24 and the angular range setter 25 sets the angular range to include this area.

Further, the angle specifying operation described here is an example, and is suitably changeable. For example, any one of a method to touch an initial angle of the area and then touch a terminal angle of the area, a method to specify the area including the target object by touching the desired target object, and a method to input a numerical value by a touch or a hardware key may be used.

After setting the angular range by the angular range setter 25, the touch panel 24 displays a screen to set the transmission signal for the angular range concerned. The user sets the transmission signal by selecting a given item. Examples of the subjects of the setting of the transmission signal include transmission power, pulse width, type of radio emission (modulation, properties of the signal, etc.), and communication wave (signal to request the radar beacon for given information, etc.). As illustrated in FIG. 4, the switch information memory 26 stores the angular range set by the angular range setter 25 and the transmission signal transmitted within this angular range, in association with each other.

The transmission signal controller 27 is capable of acquiring stored contents in the switch information memory 26. The transmission signal controller 27 receives a current rotational angle of the antenna 11 from the angle detector 13. The transmission signal controller 27 is capable of controlling the setting of the transmission signal and the transmission thereof performed by the transmission circuit 14. Thus, the transmission signal controller 27 switches the transmission signal to be transmitted in the direction within the angular range, based on the subjects stored in the switch information memory 26.

Figure 5:
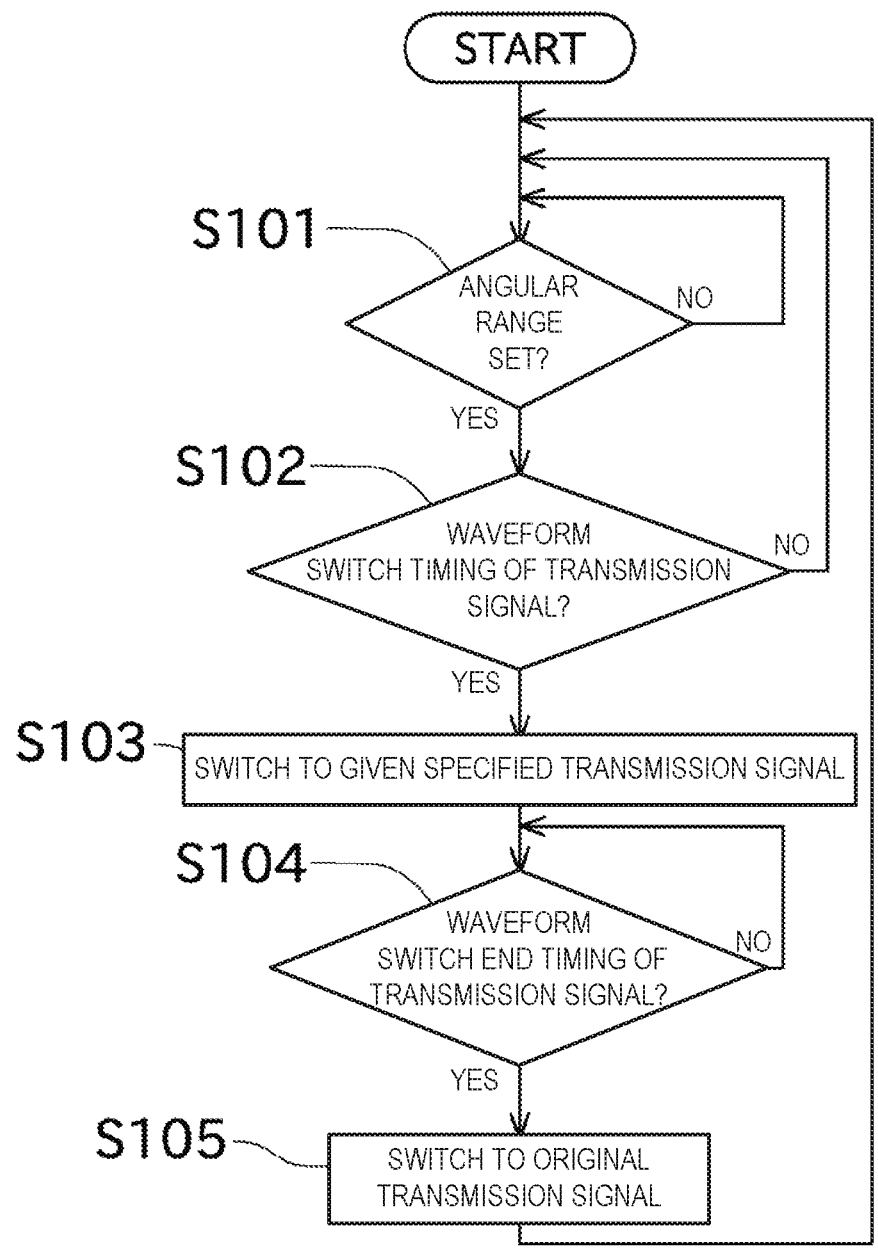
FIG. 5 is a flowchart illustrating processing performed by a transmission signal controller.

The transmission signal controller 27 performs the processing illustrated in the flowchart of FIG. 5, for example. Note that this flowchart is an example, and the contents or order of the processing may be changed, at least part of the processing may be omitted, or other processing may be added.

While the radar apparatus is in operation, the transmission signal controller 27 determines whether the angular range is set (S101). If the angular range is set, the transmission signal controller 27 determines whether a current timing is a waveform switch timing of the transmission signal (S102). This determination is performed based on whether the detection result of the angle detector 13 (the rotational angle of the antenna 11) is within the angular range stored in the switch information memory 26.

If the current timing is the waveform switch timing of the transmission signal, the transmission signal controller 27 switches the transmission signal to a given specified transmission signal based on the stored contents in the switch information memory 26 (S103). During the transmission of the transmission signal after the switch, the transmission signal controller 27 determines whether a current timing is a timing to end the waveform switch of the transmission signal (S104). This determination is performed based on whether the detection result of the angle detector 13 (the rotational angle of the antenna 11) is out of the angular range stored in the switch information memory 26.

If the current timing is the waveform switch end timing of the transmission signal, the transmission signal controller 27 switches the transmission signal to the original transmission signal (S105).

Next, the radar image displayed as a result of the above processing is described. The radar image illustrated in FIG. 2 is a radar image before the above processing. FIG. 2 displays echoes indicating a weak echo and a radar beacon. With the current transmission power, the weak echo is not particularly displayed on the radar image. To particularly display the weak echo, the transmission signal with high transmission power is required to be transmitted. Further, since the radar beacon does not respond to a transmission signal with long pulse width, the response signal of the radar beacon is not displayed on the radar image. To display the response signal of the radar beacon, the transmission signal transmitted is required to have a short pulse width.

Therefore, the user performs the angle specifying operation as illustrated in FIG. 3, setting to increase the transmission power for an angular range including the weak echo, and setting to shorten the pulse width for the angular range including the radar beacon. Note that the signal processor 21 needs to perform the pulse compression corresponding to the pulse width. Therefore, the signal processor 21 performs a pulse compression suitable for the transmitted transmission signal.

Figure 6:
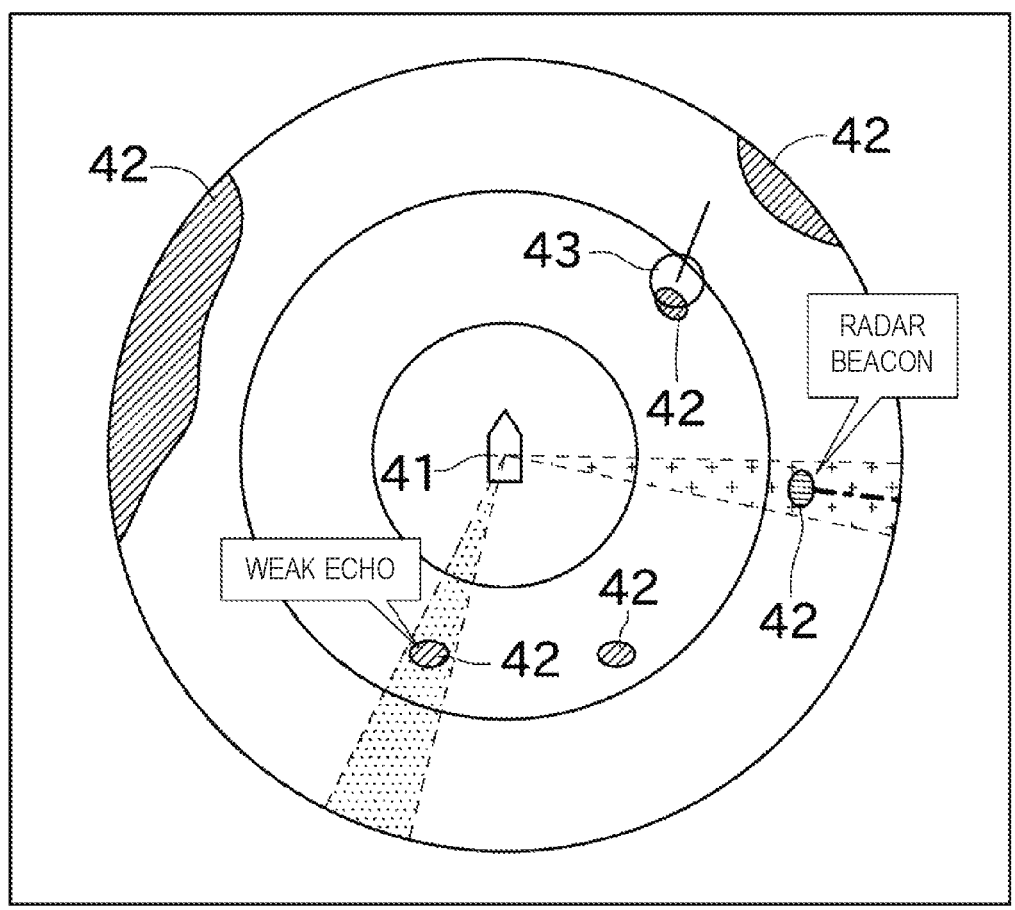
FIG. 6 is a view illustrating a radar image obtained by processing performed by the transmission signal controller.

As a result, the radar image illustrated in FIG. 6 is displayed. In the radar image of FIG. 6, the weak echo is displayed larger and particularly, and the response signal of the radar beacon is displayed. Further in this radar image, the display mode for a direction within the set angular range is different from that for the other direction outside the set angular range (the image is displayed by differentiating the ranges from each other). For example, the boundary of the angular range from outside thereof is displayed by the dashed line and color or brightness within the angular range is varied. Furthermore, in this embodiment, two angular ranges are set, and since transmitted transmission signal is different between the directions within these angular ranges, one of the color and brightness is varied between the two angular ranges.

Thus, the user can intuitively and easily check whether the set angular range corresponds to a bearing of his/her intention.

To cancel the setting of the angular range, the user may touch the angular range concerned or move the finger to follow the angular range. Note that, in addition to the touch, it is also possible to cancel the setting by calling for a menu screen etc. and selecting the angular range concerned. Moreover, by the touch or through the menu screen etc., all the angular ranges may be canceled at the same time.

Next, automatic setting and update of the angular range by the target object tracker 22 is described with reference to FIG. 7.

If the weak echo indicates the second ship on move, and if checking of the weak echo continuously and particularly is desired, the angular range needs to be updated as needed according to a change in a relative position of the second ship. However, since it is troublesome for the user to perform this operation every time, the target object tracker 22 performs the operation instead.

For example, the user gives an instruction to increase the transmission power of the transmission signal to be transmitted toward the weak echo. In response to this, the target object tracker 22 tracks the weak echo concerned and outputs the direction corresponding to the weak echo to the angular range setter 25. The angular range setter 25 sets the range including the inputted direction as the angular range.

Figure 7:
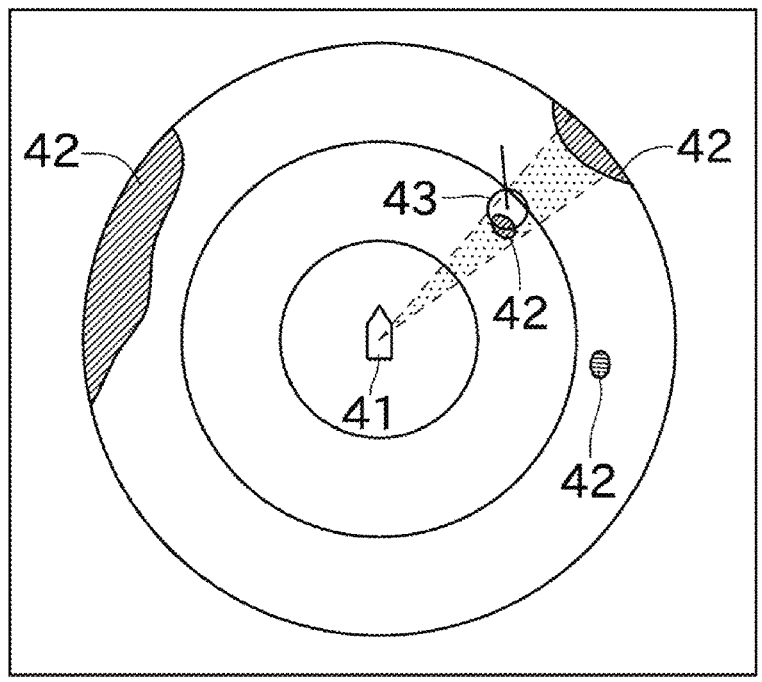
FIG. 7 shows views illustrating an example of an update of an angular range according to echo shifting.
Figure 7:
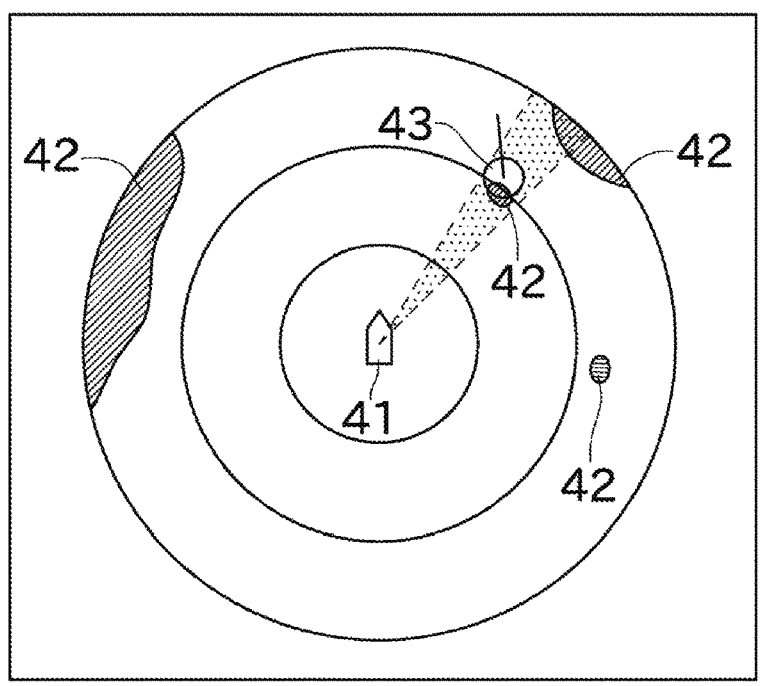

By repeatedly performing this processing, as illustrated in Parts (a) and (b) of FIG. 7, even when a relative bearing to the weak echo indicating the second ship is changed, the transmission signal with high transmission power is automatically transmitted toward the weak echo. Thus, it is possible to continuously and particularly display the observed weak echo while reducing the burden on the user.

Next, a first modification of the embodiment is described with reference to FIGS. 8 to 10. Note that in descriptions of the first modification and a second modification given later, the configurations same as or similar to the embodiment may be denoted with the same reference characters and the description thereof may be omitted.

Similar to the embodiment, a pulse compression radar transmits, as a transmission signal, a modulated pulse signal which is a result of frequency modulation by using a semiconductor amplifier. This modulated pulse signal is known to cause an influence, such as interference or interruption against other signal, on a wireless equipment for a weather radar, a receiver for satellite broadcast etc. The configuration given in this modification is to prevent a modulated pulse signal from being transmitted to a wireless equipment, in order to prevent the influence on this wireless equipment.

Hereinafter, the configuration of preventing the modulated pulse signal from being transmitted to the wireless equipment is described with reference to a situation illustrated in Part (a) of FIG. 9 which illustrates a first ship 91, lands 62, and wireless equipments 63.

Figure 8:
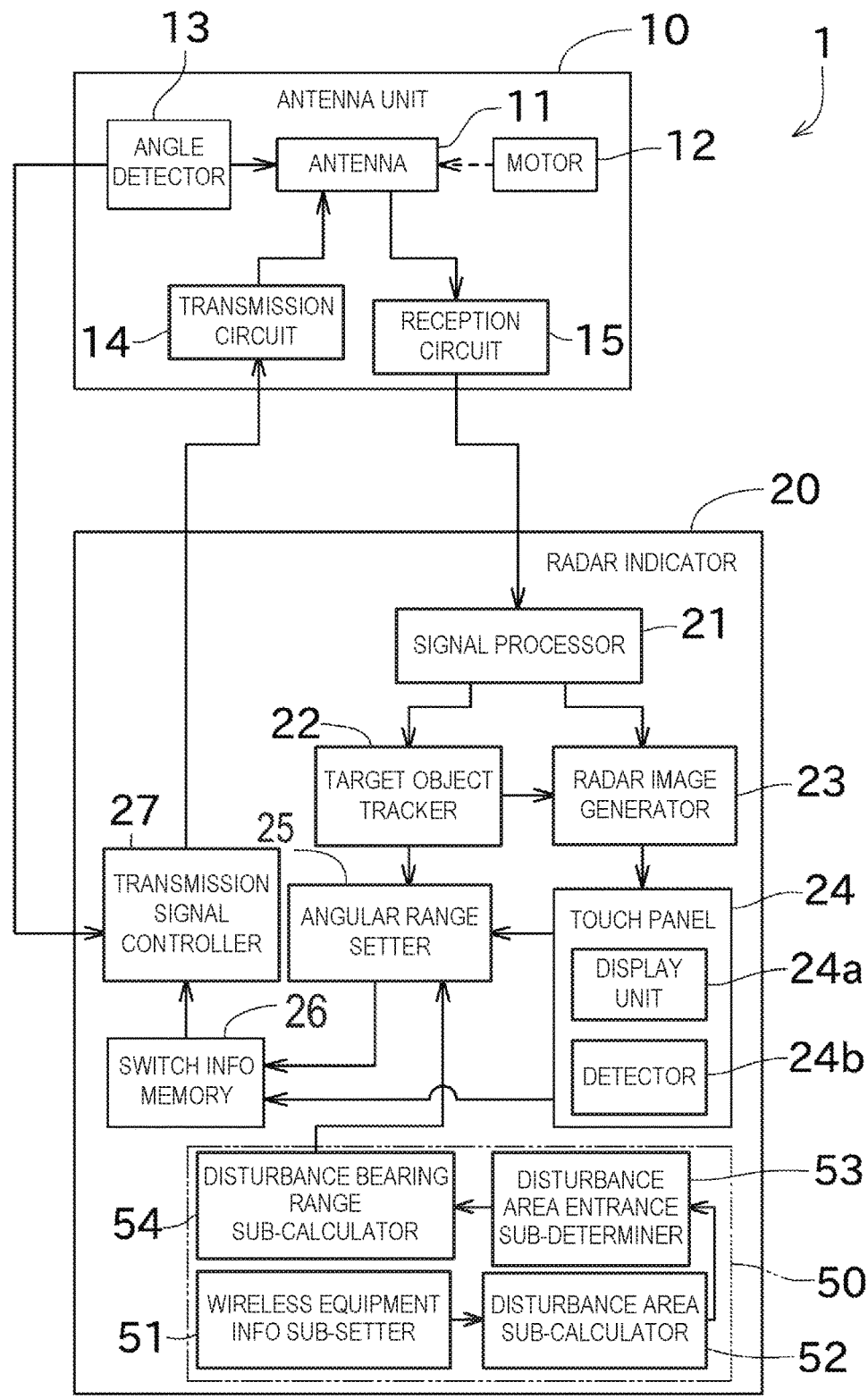
FIG. 8 is a block diagram illustrating a structure of a radar apparatus according to a first modification.

As illustrated in FIG. 8, the radar apparatus 1 of the first modification includes a disturbance preventer 50 in addition to the configuration of the embodiment. The disturbance preventer 50 includes a wireless equipment information sub-setter 51, a disturbance area sub-calculator 52, a disturbance area entrance sub-determiner 53, and a disturbance bearing range sub-calculator (determiner) 54.

The wireless equipment information sub-setter 51 sets positional information (e.g., latitude and longitude information) of the wireless equipment with a possibility of receiving the influence from the modulated pulse signal. The positional information of the wireless equipment may be acquired through any route. It may be acquired from the radar apparatus 1 or from an external device. Moreover, the user may set it manually.

The disturbance area sub-calculator 52 acquires the positional information of the wireless equipment from the wireless equipment information sub-setter 51. The disturbance area sub-calculator 52 sets the disturbance area based on the positional information of the wireless equipment (see Part (b) of FIG. 9). The disturbance area is an area with the possibility of causing the influence on the wireless equipment when the first ship is located therein. The disturbance area is set to have a given distance range from the wireless equipment, for example. The distance range may be changed according to the specification of the radar apparatus 1 or the wireless equipment.

Note that if the position of the wireless equipment and the orientation of the antenna are fixed, the disturbance area may be calculated based on an antenna pattern calculated using an external diameter, a bearing angle, and an elevation angle of the antenna. For example, the wireless equipment information sub-setter 51 sets the external diameter, the bearing angle, and the elevation angle of the antenna in addition to the positional information of the wireless equipment. The disturbance area sub-calculator 52 calculates the antenna pattern based on the contents set by the wireless equipment information sub-setter 51, and calculates the disturbance area based on the antenna pattern.

The disturbance area entrance sub-determiner 53 acquires the positional information of the first ship from a GPS receiver which is not illustrated, and acquires the disturbance area from the disturbance area sub-calculator 52. The disturbance area entrance sub-determiner 53 determines whether the first ship is located in the disturbance area. If the first ship is determined as located in the disturbance area, the disturbance area entrance sub-determiner 53 notifies the disturbance bearing range sub-calculator 54 of this information.

Figure 9:
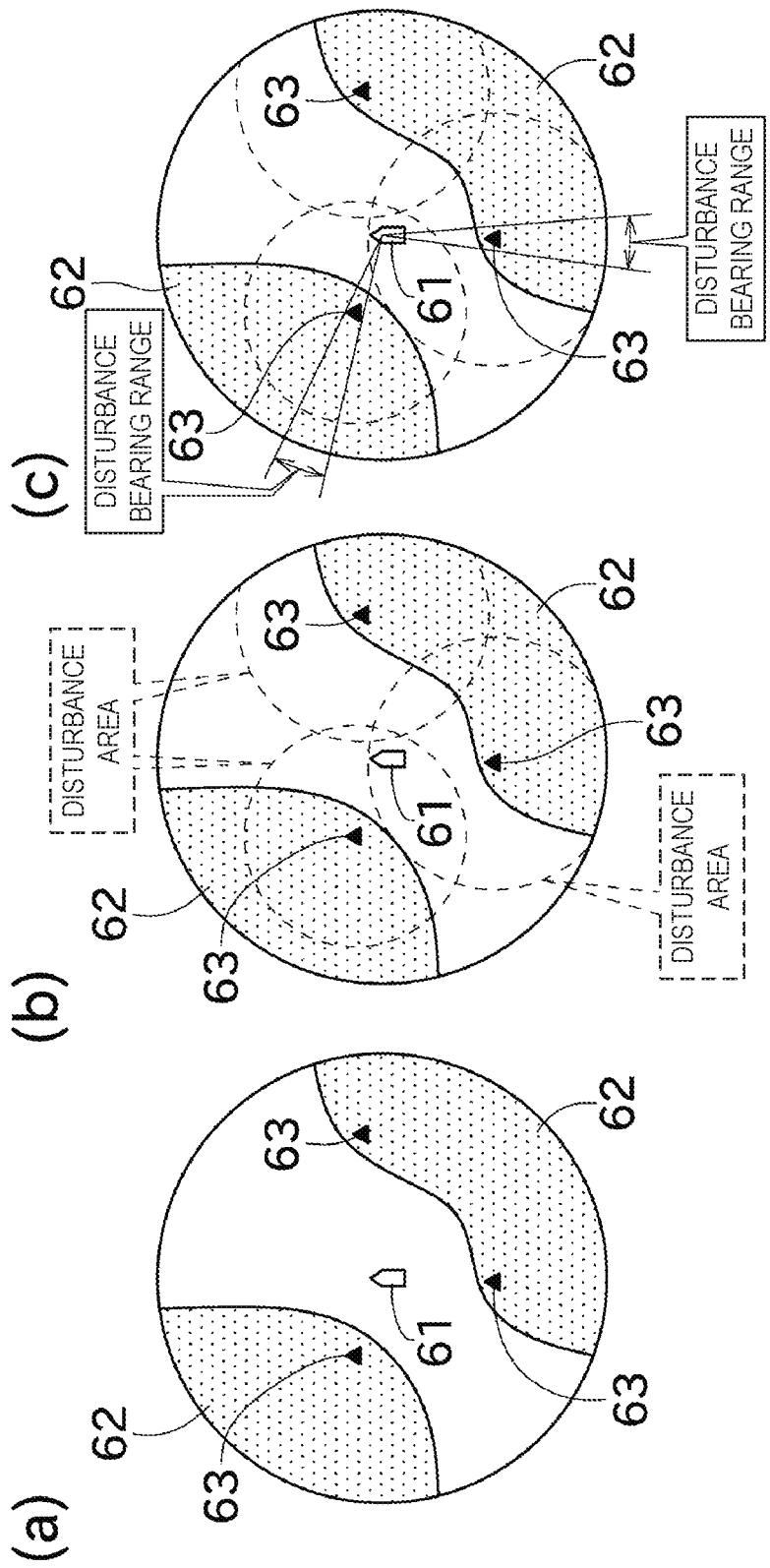
FIG. 9 shows views illustrating a concept of a disturbance area and a disturbance bearing range.

The disturbance bearing range sub-calculator 54 calculates (determines) the disturbance bearing range upon receiving the notification from the disturbance area entrance sub-determiner 53 (see Part (c) of FIG. 9). The disturbance bearing range is a bearing range indicating the bearing at which the wireless equipment as the subject of the disturbance area is located, and bearings therearound (e.g., about a few degrees). Note that the size of the disturbance bearing range may be adjusted according to the beam width of the transmission signal transmitted by the radar apparatus 1. The disturbance bearing range sub-calculator 54 outputs the calculated disturbance bearing range to the angular range setter 25.

The angular range setter 25 sets the angular range to be the disturbance bearing range inputted from the disturbance bearing range sub-calculator 54, and stores it in the switch information memory 26.

Next, a transmission signal transmitted in a direction within the disturbance bearing range and a transmission signal transmitted in other direction outside the disturbance bearing range are described.

Figure 10:
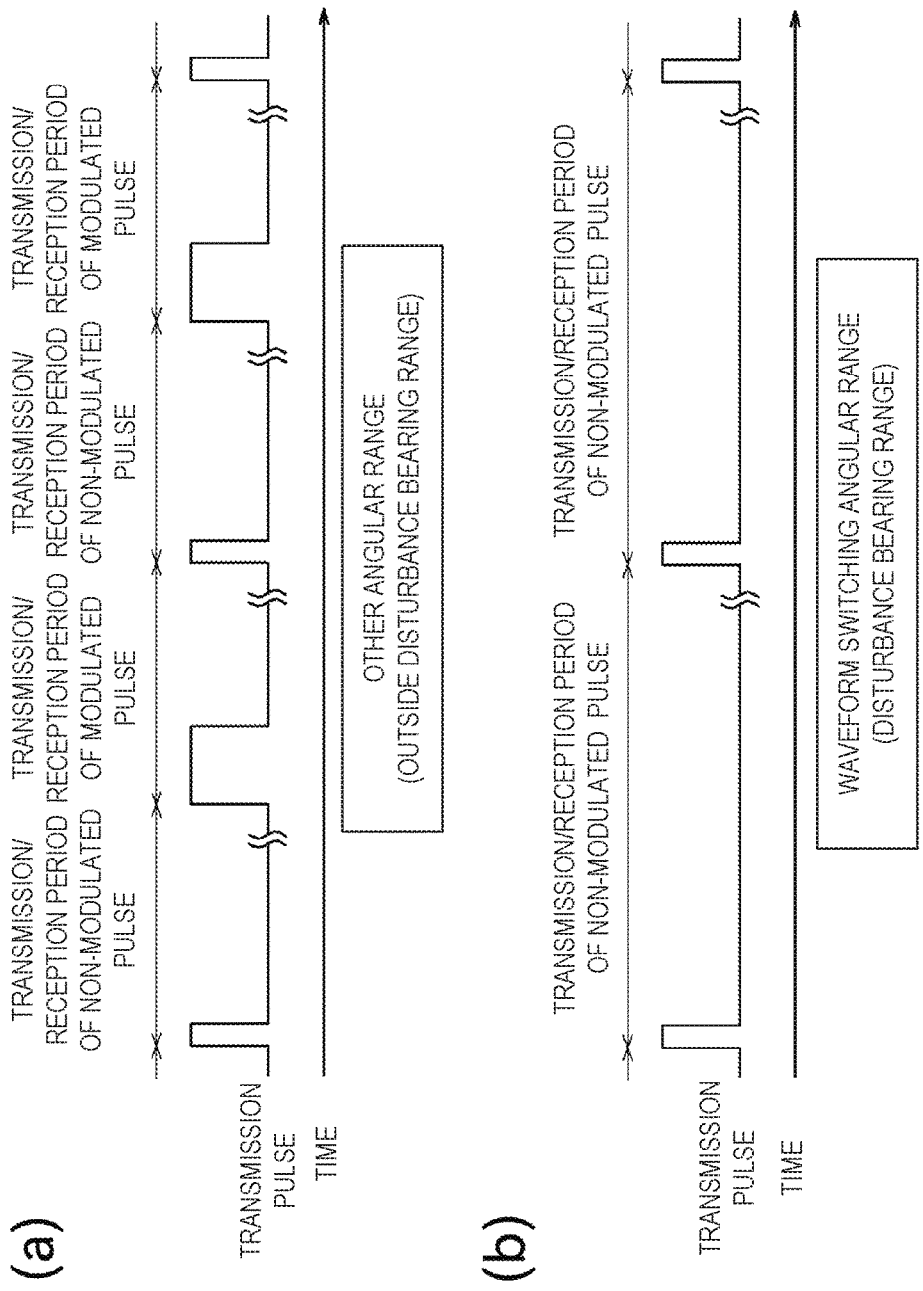
FIG. 10 shows views illustrating comparison of a transmission signal transmitted in a direction within an angular range (disturbance bearing range) with a transmission signal transmitted in a direction outside the angular range.

Part (a) of FIG. 10 is a view illustrating a waveform of the transmission signal transmitted to outside the disturbance bearing range. The radar apparatus 1 alternately transmits a non-modulated pulse signal and a modulated pulse signal for outside the disturbance bearing range. This is to detect the target object near the first ship by using the non-modulated pulse signal and detect other than that by using the modulated pulse signal, since it is difficult to detect the target object near the first ship by using the modulated pulse signal due to its long pulse width.

The radar apparatus 1 performs signal processing by differentiating a reflection wave caused by the modulated pulse signal transmitted to outside the disturbance bearing range, from a reflection wave caused by the non-modulated pulse signal transmitted to the outside of the disturbance bearing range. Further the radar apparatus 1 generates the radar image of the outside of the disturbance bearing range.

Moreover, Part (b) of FIG. 10 is a view illustrating a waveform of the transmission signal transmitted within the disturbance bearing range. Within the disturbance bearing range, the radar apparatus 1 detects the target object by only using the non-modulated pulse signal and without the modulated pulse signal. Note that, in the case of transmitting only the non-modulated pulse signal, any transmission timing may be applied. For example, as illustrated in FIG. 10, a configuration of suspending the transmission of the modulated pulse signal may be applied, or the non-modulated pulse signal may be transmitted instead of the modulated pulse signal.

The radar apparatus 1 processes the non-modulated pulse signal transmitted to the disturbance bearing range and generates part of the radar image corresponding to the disturbance bearing range.

Note that, since whether the first ship enters the disturbance area varies and the disturbance bearing area varies depending on the travel of the first ship, the disturbance preventer 50 repeats the above processing.

By performing the above processing, within a given angular range, the influence on the wireless equipment is prevented, and within other angular range, it is possible to accurately grasp the target object in close distance and the target object in far distance individually. Moreover, since the disturbance preventer 50 automatically sets the change angle and continuously updates the disturbance bearing range etc., it is possible to reduce the burden on the user.

Next the second modification is described with reference to FIG. 11. With the configuration of the first modification, the specific position of the wireless equipment is determined and the modulated pulse signal is not transmitted to the direction in which the wireless equipment is located. On the other hand, with a configuration of the second modification, a specific position of the land is determined and the modulated pulse signal is not transmitted to the direction in which the land is located. Since the wireless equipment is normally installed on the land, also with this configuration, it is possible to exert similar effects.

Figure 11:
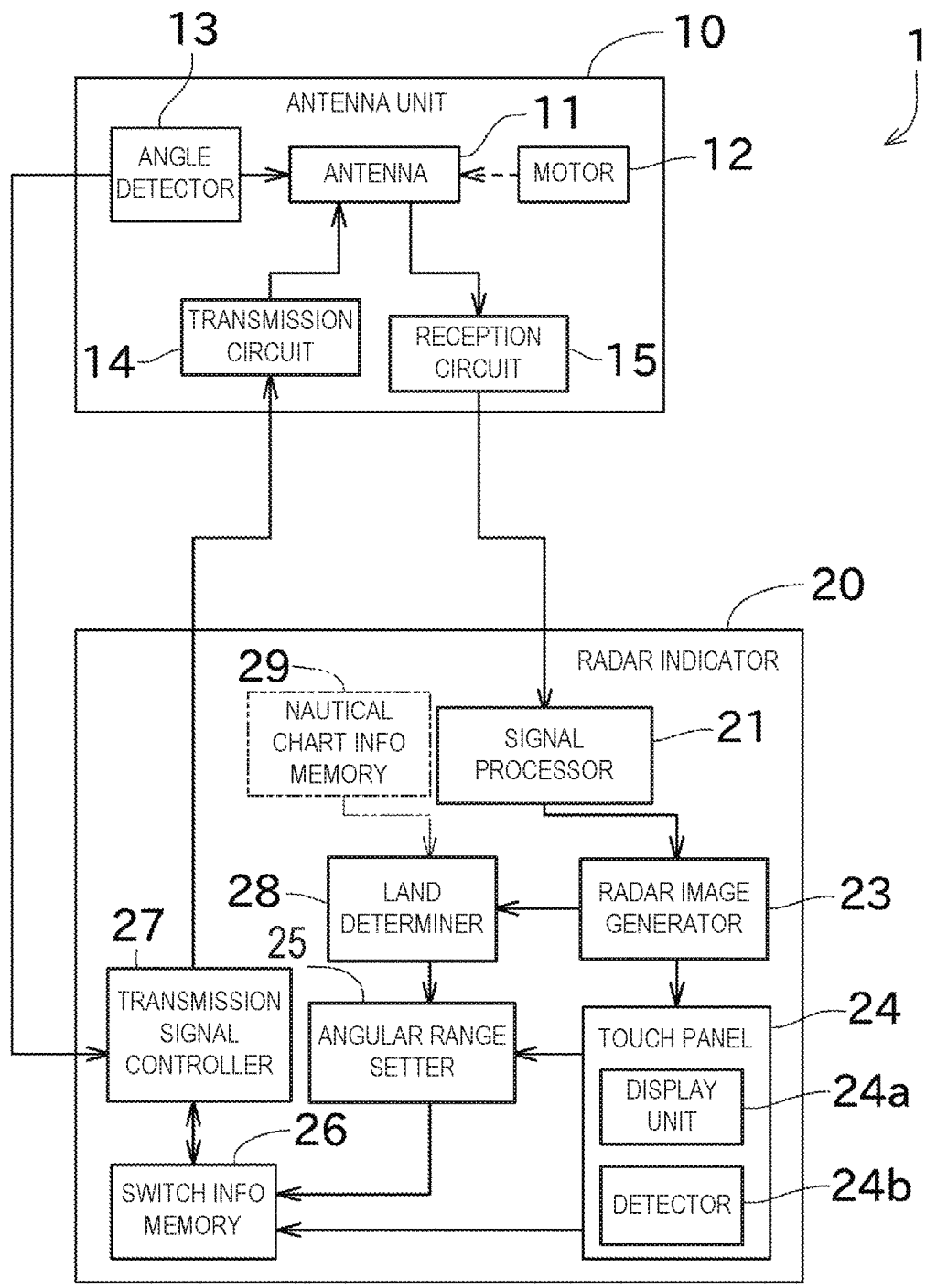
FIG. 11 is a block diagram illustrating a structure of a radar apparatus according to a second modification.

As illustrated in FIG. 11, the radar apparatus 1 (radar indicator 20) of the second modification includes a land determiner (determiner) 28. The land determiner 28 determines the direction in which the land is located with respect to the first ship.

The land determiner 28 determines the land based on the reception signal. The land determiner 28 acquires the radar image from the radar image generator 23. The land determiner 28 determines whether the echo indicates the land, based on the shape, size etc. of the echo. Thus, the land determiner 28 determines a direction (area) to which the echo indicating the land belongs. Note that the land determiner 28 may determine the direction in which the land is located, based on the reception signal acquired from the signal processor 21.

Moreover, the land determiner 28 is capable of determining the direction in which the land is located, based on a nautical chart. In this case, the land determiner 28 acquires nautical chart information from a nautical chart information memory 29 provided internally or externally to the radar indicator 20. Further, the land determiner 28 acquires the positional information of the first ship from a GPS receiver etc. and acquires the bearing of the first ship from a bearing sensor etc. The land determiner 28 determines the direction (area) in which the land is located, by calculating the position and orientation of the first ship on the nautical chart. Note that the land determiner 28 may acquire geographical chart information instead of the nautical chart information.

As described above, each radar apparatus 1 of the embodiment and modifications includes the determiner (target object tracker 22, detector 24b, disturbance bearing range sub-calculator 54, land determiner 28), the angular range setter 25, and the transmission signal controller 27. The determiner determines one of the target object and the area. The angular range setter 25 sets the angular range centering on the position of the first ship to include the one of the target object and the area determined by the determiner. The transmission signal controller 27 switches the waveform of the transmission signal to be different between the direction within the angular range and the other direction outside the angular range.

Thus, it becomes possible to transmit a suitable transmission signal according to the target object around the radar apparatus 1. As a result, it becomes possible to suitably display the target object around the radar apparatus 1 or the response signal of the radar beacon etc.

Although the embodiment and modifications of this disclosure are described above, the above configurations may be changed as follows.

In the above description, the transmission power, the pulse width, the type of radio emission, the communication wave etc. are described as specific examples for the switch in waveform of the transmission signal; however, the waveform itself of the transmission signal may be switched by changing a subject different from the above examples.

Note that, the touch detecting method is not limited to the projected capacitance system, and other method may suitably be used. Moreover, also other than the touch by a finger, for example, a configuration in which the touch is detected by a tapered stick-like member may be applied.

In the above description, the configuration in which the target object tracker 22 tracks the target object by performing the TT processing and updates the angular range is disclosed; however, a positional change of the target object may be detected by using an AIS (Universal Shipborne Automatic Identification System). Moreover, the angular range may be updated according to a change in the relative position of a fixed target object (e.g., radar beacon) instead of a movable target object.

As described in the first modification, conventionally, the transmission signal with short pulse width for short range detection (short pulse signal) and the transmission signal with long pulse width for long range detection (long pulse signal) are alternately transmitted. In this case, the angular range and the waveform corresponding thereto (transmission power etc.) may be set for the short and long pulse signals as a whole. In contrast, the short and long pulse signals may be applied to different angular ranges and with waveforms.

In the above description, the radar apparatus installed in the ship is described as an example; however, this configuration is applicable to radar apparatuses installed in other movable bodies (e.g., aircrafts). Moreover, this configuration is applicable to radar apparatuses installed in a lighthouse, on a water channel, at a port, etc. and having a configuration of detecting a surrounding situation by a radar echo. Also with any of the radar apparatuses installed in the other movable bodies, the lighthouse etc., since the need to transmit different transmission signals according to the target object remains, the effects which are obtained with the application to the ship are similarly exerted.

With the configuration of the first modification, only the non-modulated pulse signal is transmitted within the disturbance bearing range where the wireless equipment is located. Instead, within the disturbance bearing range, the pulse width, the transmission power, a repetition frequency, a transmission frequency, etc. may be changed according to the target wireless equipment. For example, if the target wireless equipment is a satellite broadcast receiver, by shortening the pulse width of the modulated pulse signal to the extent it does not influence the satellite broadcast receiver, even within the disturbance bearing range, it becomes possible to transmit the non-modulated pulse signal and the modulated pulse signal.

DESCRIPTION OF REFERENCE CHARACTERS

1 Radar Apparatus
10 Antenna Unit
11 Antenna
12 Motor
13 Angle Detector
14 Transmission Circuit
15 Reception Circuit
20 Radar Indicator
21 Signal Processor
22 Target Object Tracker (Determiner)
23 Radar Image Generator
24 Touch Panel
24a Display Unit
24b Detector (Determiner)
25 Angular Range Setter
26 Switch Information Memory
27 Transmission Signal Controller
28 Land Determiner (Determiner)
29 Nautical Chart Information Memory
50 Disturbance Preventer
54 Disturbance Bearing Range Calculator (Determiner)

What is claimed is:

1. A radar apparatus for detecting a target object around the radar apparatus by transmitting a transmission signal while changing a transmitting direction centering on a position of the radar apparatus, comprising:
    a hardware processor programmed to at least:
        determine one of a target object and an area;
        set an angular range centering on the position of the radar apparatus to include the one of the target object and the area; and
        change a waveform of the transmission signal to be different between a direction within the angular range and a direction outside the angular range;
    an antenna configured to transmit the transmission signal while rotating; and
    an angle detector configured to detect a rotational angle of the antenna,
    wherein when the rotational angle of the antenna detected by the angle detector is within the angular range, a transmission signal controller transmits the transmission signal having a waveform different from that in the direction outside the angular range.

2. The radar apparatus of claim 1, wherein the hardware processor is further programmed to change a transmission power of the transmission signal to be different between the direction within the angular range and the direction outside the angular range.

3. The radar apparatus of claim 2, wherein the hardware processor is further programmed to change a pulse width of the transmission signal to be different between the direction within the angular range and the direction outside the angular range.

4. The radar apparatus of claim 3, wherein the hardware processor is further programmed to use the transmission signal transmitted in the direction within the angular range to be a communication wave.

5. The radar apparatus of claim 4, wherein the hardware processor is further programmed to:
    track the target object based on target object information previously acquired, and
    set the angular range to include the target object tracked by the target object tracker.

6. The radar apparatus of claim 5, wherein the hardware processor is further programmed to change whether to include a modulated pulse signal in the transmission signal to be different between the direction within the angular range and the direction outside the angular range.

7. The radar apparatus of claim 6, wherein in the direction within the angular range, a non-modulated pulse signal is transmitted as the transmission signal, and
    wherein in the direction outside the angular range, the non-modulated pulse signal and the modulated pulse signal are transmitted as the transmission signal.

8. The radar apparatus of claim 7, wherein the hardware processor is further programmed to determine a position of a wireless equipment, and
    wherein the angular range setter sets the angular range based on the position of the wireless equipment determined by the determiner.

9. The radar apparatus of claim 7, wherein the hardware processor is further programmed to determine a position of a land, and
    wherein the angular range setter sets the angular range to include a direction in which the land is located.

10. The radar apparatus of claim 9, wherein the hardware processor is further programmed to determine the position of the land based on a reception signal received as a reflection wave caused by the transmission signal.

11. The radar apparatus of claim 10, wherein the hardware processor is further programmed to generate a radar image and perform display processing for the direction within the angular range and display processing for the direction outside the angular range in different manners.

12. The radar apparatus of claim 9, wherein the hardware processor is further programmed to determine the position of the land based on one of a nautical chart and a geographical chart.

13. The radar apparatus of claim 12, comprising a display unit configured to display a radar image,
    wherein the hardware processor is further programmed to:

detect an angle specifying operation that is a touch performed on the display unit and an operation of specifying the angular range, and set the angular range according to the angle specifying operation detected by the detector.

14. The radar apparatus of claim 13, wherein the angle specifying operation is an operation of moving the touched position while the display unit is touched.

15. A method of controlling a transmission signal, used by a radar apparatus for detecting a target object around the radar apparatus by transmitting a transmission signal while changing a transmitting direction centering on a position of the radar apparatus, comprising:

determining one of a target object and an area;

setting an angular range centering on the position of the radar apparatus to include the one of the target object and the area determined by the determining;

changing a waveform of the transmission signal to be different between a direction within the angular range and a direction outside the angular range;

transmitting the transmission signal via a rotating antenna;

determining a rotational angle of the rotating antenna; and when it is determined that the rotation angle of the rotating antenna is within the angular range, transmitting the transmission signal having a waveform different from that in the direction outside the angular range.

* * * * *